April 21, 1964     J. S. PORTER     3,129,513
REEL AND SELF-DRAINING SAMPLER TUBE ASSEMBLY
Filed June 5, 1957     2 Sheets-Sheet 1

INVENTOR.
JOHN S. PORTER
BY
Knox & Knox

April 21, 1964  J. S. PORTER  3,129,513
REEL AND SELF-DRAINING SAMPLER TUBE ASSEMBLY
Filed June 5, 1957  2 Sheets-Sheet 2

INVENTOR.
JOHN S. PORTER
BY  Knox & Knox

United States Patent Office 3,129,513
Patented Apr. 21, 1964

3,129,513
REEL AND SELF-DRAINING SAMPLER
TUBE ASSEMBLY
John S. Porter, Escondido, Calif.
(14134 Midland Ave., Poway, Calif.)
Filed June 5, 1957, Ser. No. 663,663
7 Claims. (Cl. 33—126.4)

The present invention relates generally to sampling devices and more particularly to a liquid sampler and reel assembly.

In many industries large capacity tanks having in many cases a height of 25 to 75 feet are used to store liquids. For example, in the petroleum products industry such tanks are used to store liquid fuels. Frequent measurement of the height of the fluid in such tanks is necessary and is accomplished by various types of dip sticks and other measuring devices, the measurement ordinarily being accomplished by an operation carried out from the top of the tank. Aside from the simple question of volumetric measurement, there is a constant requirement for checking the amount of condensation water which has accumulated in the fuel, as well as certain other types of contamination, and in many stored fluids there is a strong tendency toward stratification which must usually be detected by means of sampling the stored fluid with a tube, preferably transparent, which is lowered slowly into the fluid, there being some means provided for retaining the sample core of fluid within the tube when the same is raised for inspection. This present invention does not relate particularly to the type of valve means used to retain the core sample in the tube, a suitable valve assembly for this purpose having been disclosed and patented in my United States Patent Number 2,751,787, issued on June 26, 1956, but this invention does embrace the combination of such a valve or its equivalent with a special reel and a sub-combination tube and tape arrangement.

It is, therefore, a primary object of this invention to provide a liquid sampler and reel assembly which can conveniently be carried to the top of a tank, the tube and measuring tape sub-assembly then being slowly unwound from the reel so that the tube will fill with a cross-section sample of the fluid in the tank, from the surface of the liquid to the level corresponding to the depth of immersion of the tube. It will be understood that the valve closes whenever the operator ceases to lower the tube either at a mid-point or at the bottom of the tank, and examination of the core sample is made by merely raising the tube and inspecting the fluid trapped in the tube, the tube being transparent to facilitate such inspection. After the inspection and measurement has been carried out, the core sample of liquid can conveniently be dumped by the use of a valve such as that described in the above mentioned patent on the opening of the valve by means of a jerk on the tube and the tube and tape sub-assembly is then easily re-wound upon the reel, whereupon the operator simply slides the reel with the tube wound thereon over his shoulder and descends again to the ground.

It is another object of this invention to provide a liquid sampler and reel assembly which is self-draining when the assembly is laid on a flat surface. This self-draining is extremely important since, if the tube is not completely drained after use, a succeeding measurement is distorted by the trapped fluid which had been allowed to remain in the tube. The self-draining feature will be fully described hereinafter and consists primarily in a special co-action between a novel spirally grooved reel and a critically dimensioned valve and tube. As will also be further explained, the provision of a non-elastic measuring tape within the tube prevents stretching thereof so that the critical dimensional relationships are maintained throughout the life of the instrument.

With these objects definitely in view, together with other objects which will appear hereinafter as this description proceeds, this invention resides in the novel construction, combination and arrangement of elements and portions as will be hereinafter described in detail in the specification, illustrated in the accompanying drawings and set forth in the claims appended to the specification.

In the drawings.

Similar characters of reference designate similar or identical elements and portions throughout the specification and throughout the different views in the drawings.

Figure 1:
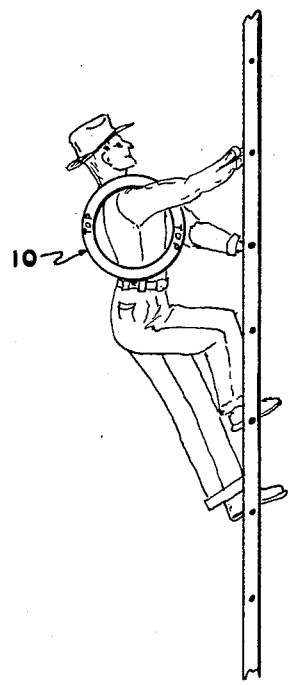
FIGURE 1 is a fragmentary elevational view of a ladder such as that used on the side of storage tanks and illustrating how the reel with the tube wound thereon is carried by an operator in ascending and descending such a tank during measuring and sampling operations.
Figure 2:
FIGURE 2 is a fragmentary view of the tube and tape and the valve secured to the end thereof, this figure being primarily proposed to illustrate how the tube and tape can flex without twisting sharply or stretching.
Figure 2:
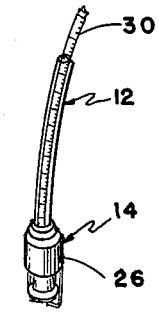

Referring now to the drawings in detail, the apparatus herein concerned may be considered as representing three principal parts, the reel 10, the tube and tape sub-assembly 12 and the valve 14. These parts, reel, tube, tape and valve are functionally and structurally related as will become more clear as this description proceeds. The exact character of the valve can be varied, although a valve such as that which is the subject matter of my Patent Number 2,751,787 is entirely suitable. This valve allows flow of fluid into the lower end of the tube and traps the fluid therein until such time as the trapped fluid is dumped by a quick jerk on the tube which opens the valve, all as fully disclosed in the said patent. This cooperation of the component elements of this invention will possibly be most clearly recognized upon consideration of the functional inter-relationship of the said elements when the assembly is laid upon a flat surface 18, since self-draining of the tube and valve is then accomplished.

Figure 3:
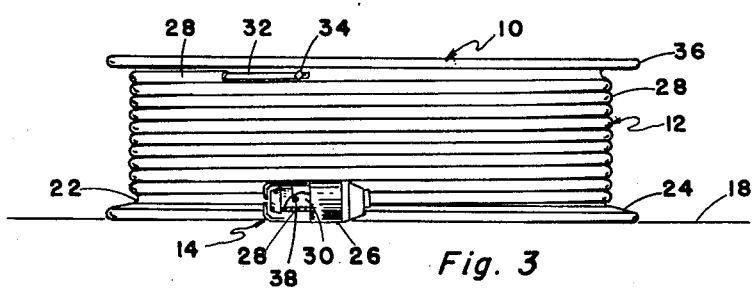
FIGURE 3 is a side elevation view of the assembly laid flat on a horizontal surface, this figure being proposed as indicating how the tube and valve are self-draining when the tube is fully wound on the reel and the whole assembly laid down.

The reel 10 includes a hollow cylindrical spool portion 20 which is provided with a single spiral groove 22. What may be considered the lowermost convolution of the spiral groove 22 is spaced from the lower extremity of the reel by a base 24, the spacer being represented in the form of a flange extending radially outwardly beyond the hollow cylindrical spool portion 20 and inclined so that the axial dimension of the base 24 is such that the said lowermost convolution of the groove 22 is axially spaced from the extremity of the base 24 a sufficient distance to insure that the tube 28 will not be kinked or bent adjacent to the valve 14. In other words, there is a critically dimensional relationship between the base 24 and the valve 14. The principal body portion 26 of the valve will determine the height above the plane 18 at which the adjacent portion of the tube 28 will be held when the assembly is laid on the surface 18 as indicated in FIGURE 3.

The transparent tube 28 and the flexible, steel measuring tape 30 are of substantially the same length and the end of the tape remote from the base 24 is fixed to the reel. This said end of tape is indicated at 32 in FIGURE 3 and a bolt or other fastening device is indicated at 34. Since there is only the single spiral groove 22 provided, the tape and tube sub-assembly will be wound in a single layer of convolutions, following the spiral groove 22 from what may be considered the top end of the reel to the base 24, and since the tape is non-elastic the proper positioning of the end 32 of the tape will assure that the valve 14 and the adjacent portion of the tube 28 will always occupy the same position when the tube is fully wound upon the reel, and the proper self-draining of the tube is thus always assured.

The steel measuring tape 30 is suitably calibrated and can be read through the transparent tube 28, and the level of liquid in the tube and other such readings as the levels of various stratified layers when these exist in the measured fluid can be determined. An important feature of this invention is the tight frictional contact of the tape 30 with the inside surface of the tube 28. Since the tape inherently resists twisting, or at least any sharp twisting thereof, the tube and tape will be wound upon the reel with the calibrations always and continuously visible through the transparent tube. It follows, that the measuring operation is simplified and facilitated by this fact that the tube and tape simply do not twist and the calibrations remain always disposed in one direction and toward the outside of the reel so that they are readable even when the tube is wound upon the reel and consistently remain in easily readable position at any short distance from the reel. One end of the tape 30 is secured to the valve by any suitable means such as the pin 38 indicated in FIGURE 3 and since the tape is non-elastic, stretching of the tube is prevented and the life of the tube is greatly increased.

Figure 4:
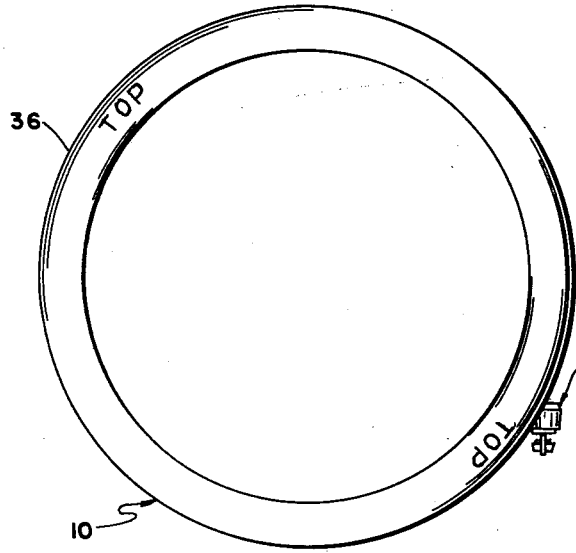
FIGURE 4 is a top plan view of the assembly.
Figure 5:
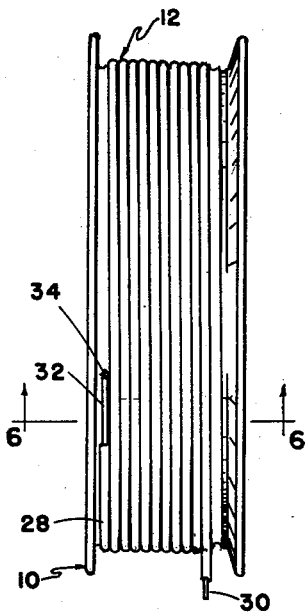
FIGURE 5 is an edge elevation view of the assembly, a portion of the tube being cut away to show the enclosed tape.
Figure 6:
FIGURE 6 is an enlarged, fragmentary view of cross-sectional character, the view being taken substantially on the line 6—6 in FIGURE 4.
Figure 6:
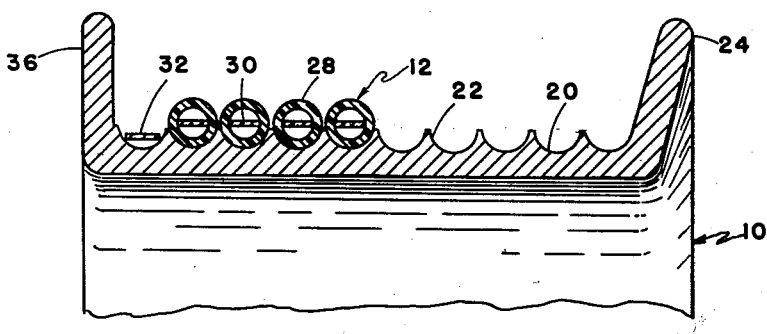

In order that the advantages of the self-draining of the tube and valve be fully realized, the top flange 36 is so marked, as indicated in FIGURES 1 and 4, so that the workmen using the device will be encouraged to lay the assembly down in the proper position for such self-draining.

Minor variations from the form of this invention may be resorted to without departure from the spirit and scope thereof and the foregoing specification and the drawings should be considered as illustrative rather than limiting.

What I claim is new and desire to secure by Letters Patent is:

1. A liquid sampler and reel assembly comprising: a cylindrical spool reel having an external curved surface with a spiral groove thereon; a liquid measuring tube wound on said reel with its convolutions in said groove; said tube being transparent and having a calibrated element therein extending throughout the length of the tube; said groove being of sufficient length to accept the total length of said tube; one end of said reel having insignia thereon indicating that that end is the top of the reel when properly laid down for draining; and the other end of the reel defining a base extending in a plane normal to the axis of the spiral groove; one end of said tube being secured to said reel at a point in said groove remote from said base, whereby the tube is self-draining when the reel, with the tube wound thereon, is laid down with said base on a horizontal surface.

2. A liquid sampler and reel assembly comprising: a cylindrical spool reel having an external curved surface with a spiral groove thereon; a liquid measuring tube wound on said reel with its convolutions in said groove; said tube being transparent and having a calibrated element therein extending throughout the length of the tube; said groove being of sufficient length to accept the total length of said tube; one end of said reel having insignia thereon indicating that that end is the top of the reel when properly laid down for draining; and the other end of the reel defining a base extending in a plane normal to the axis of the spiral groove; one end of said calibrated element being secured to said reel at a point in said groove remote from said base, whereby the tube is self-draining when the reel, with the tube wound thereon, is laid down with said base on a horizontal surface; said reel being hollow to permit entry of a human arm thereinto for easy carrying, and said base being an annular end edge portion of the reel.

3. A liquid sampler and reel assembly comprising: a cylindrical spool reel having an external curved surface with a spiral groove thereon; a liquid measuring tube wound on said reel with its convolutions in said groove; one end of said reel defining a base having an extremity extending in a plane normal to the axis of the spiral groove, whereby the tube is self-draining when the reel, with the tube wound thereon, is laid down with said base on a horizontal surface; a valve on one end of said tube; said base and valve being relatively dimensioned to space that portion of said groove adjacent to said base a sufficient distance from said extremity of the base to prevent kinking of the tube when the valve is also laid on said horizontal surface.

4. A liquid sampler and reel assembly comprising: a cylindrical spool reel having an external curved surface with a spiral groove thereon; a liquid measuring tube wound on said reel with its convolutions in said groove; one end of said tube being secured to said reel adjacent one end of said reel; said tube being transparent; and a calibrated, elongated element within said tube; the end of said element remote from said base being fixed to said reel with the calibrations disposed radially outwardly of the reel; and said element being resistive to twisting, whereby said element is retained in position with all the calibrations on that portion wound on the reel easily visible; said element having the general characteristics of a steel measuring tape and having tight frictional contact with said tube throughout the length thereof, whereby the tube is also prevented from twisting and stretching.

5. A liquid sampler assembly comprising: a reel; a calibrated tape having one end secured to the reel; a transparent tube enclosing said tape and substantially coextensive in length therewith; said tube being hollow and adapted to receive a quantity of a liquid to be measured; and a valve connected to said tape and tube at the other end of said tape.

6. A liquid sampler assembly comprising: a reel; a calibrated tape having one end secured to the reel; a transparent tube covering said tape and substantially coextensive in length therewith; said tube being hollow and adapted to receive a quantity of a liquid to be measured; and a valve connected to said tube at the other end of said tape; said tape being resistive to twisting and the calibrations on said tape being visible throughout the length of the tape when coiled in a single layer of coils on said reel.

7. A liquid sampler and reel assembly comprising:
a cylindrical spool reel having an external curved surface with a spiral groove thereon;
a liquid measuring tube wound on said reel with its convolutions in said groove;
said tube being transparent;
and a calibrated, elongated element within said tube;
one end of said element being fixed to one end of said reel with the calibrations disposed radially outwardly of the reel;
and said element being resistive to twisting, whereby said element is retained in position with all the calibrations on that portion wound on the reel easily visible.

References Cited in the file of this patent

UNITED STATES PATENTS

| | | |
|---|---|---|
| 1,017,532 | Glenn | Feb. 13, 1912 |
| 2,006,301 | Meyer | June 25, 1935 |
| 2,468,218 | Markham | Apr. 26, 1949 |
| 2,471,329 | Keuffel | May 24, 1949 |
| 2,544,262 | Hall | Mar. 6, 1951 |
| 2,593,830 | Baker | Apr. 22, 1952 |

FOREIGN PATENTS

| | | |
|---|---|---|
| 1,040,561 | France | May 27, 1953 |